No. 731,590.

Patented June 23, 1903.

UNITED STATES PATENT OFFICE.

CHARLES W. MERRILL, OF ALAMEDA, CALIFORNIA.

PROCESS OF LEACHING ORES OR TAILINGS WITH SOLUTIONS OF ALKALINE CYANIDS.

SPECIFICATION forming part of Letters Patent No. 731,590, dated June 23, 1903.

Application filed February 9, 1898. Serial No. 669,678. (No specimens.)

*To all whom it may concern:*

Be it known that I, CHARLES W. MERRILL, a citizen of the United States, residing at Alameda, in the county of Alameda and State of California, have invented certain new and useful Improvements in Processes of Treating Ores or Tailings with Solutions of Alkali-Metal Cyanids; and I do hereby declare the following to be a full, clear, and exact description of the same.

My invention relates to an improvement in the art of treating that class of ore and tailings which contains reducing salts or minerals with solutions of alkali-metal cyanids; and it consists in subjecting the above reducing salts or minerals in the ore or tailings to the action of the oxidizing power of an alkali-metal or alkaline-earth-metal hypochlorite for the purpose of oxidizing the reducing agents contained in the class of ore and tailings aforesaid.

In the usual method of treating ore, tailings, or like materials with alkali-metal cyanids it is often found that by reason of the presence in the material which is being worked of reducing salts or minerals the dissolving action of the alkali-metal-cyanid solution on the precious metals is greatly lessened or reduced to nothing because this reducing material, frequently present in large quantities, abstracts the dissolved oxygen from the solution, which dissolved oxygen is essential to the dissolution of the precious metal contained therein and more than sufficient therefor when no oxygen absorbing or reducing salts or minerals are present. In order to raise these reducing salts or minerals to a higher state, and thus render them innocuous toward the oxygen lixiviant, I employ an alkali-metal or alkaline-earth-metal hypochlorite. For example, if a ferrous salt which absorbs oxygen rapidly be present, as is frequently the case, the alkali-metal or alkaline-earth-metal hypochlorite will raise this to what is known as a "ferric salt," which will not absorb oxygen from the solution and will not therefore detract from the dissolving activity of the lixiviant. I have found that a suitable hypochlorite for this purpose is hypochlorite of calcium, and for practical uses this hypochlorite mixed with chlorid of calcium in the form of bleaching-powder, which is obtainable in sufficient quantities at low cost, is effective for the purpose. I am thus enabled to effect the necessary dissolution with a comparatively small number of vats and in a comparatively short time, thus lessening the original capital expenditure, reducing operating cost, and in some cases making possible the economic treatment of material not otherwise available.

In my process I treat the ore or tailings in dams, sluices, vats, boxes, or other containers with a hypochlorite either as a powder or solution until the oxidation of the reducing matter is sufficient to enable the dissolution of the precious metals by the cyanid solution to proceed effectively. After completing the economic period of contact with the solution or solutions it or they are partially or wholly displaced by a water wash and the residue removed from the vat by sluicing, shoveling, dredging, or other well-known mechanical means, and the container is then ready for recharging.

Having thus described my invention, what I claim as new, and desire to secure by Letters Patent, is—

1. The improvement in treating ores or tailings containing reducing agents with solutions of alkali-metal cyanids which consists in oxidizing the reducing agents with an alkali-metal or alkaline-earth-metal hypochlorite substantially as described.

2. The improvement in treating ores or tailings containing reducing agents, with solution of alkali-metal cyanids, consisting in oxidizing the reducing agents with an alkali-metal or alkaline-earth-metal hypochlorite, and subsequently treating the ores or tailings with a solution of an alkali-metal or alkaline-earth-metal cyanid.

In witness whereof I have hereunto set my hand.

CHARLES W. MERRILL.

Witnesses:
D. B. RICHARDS,
WALTER F. VANE.